UNITED STATES PATENT OFFICE.

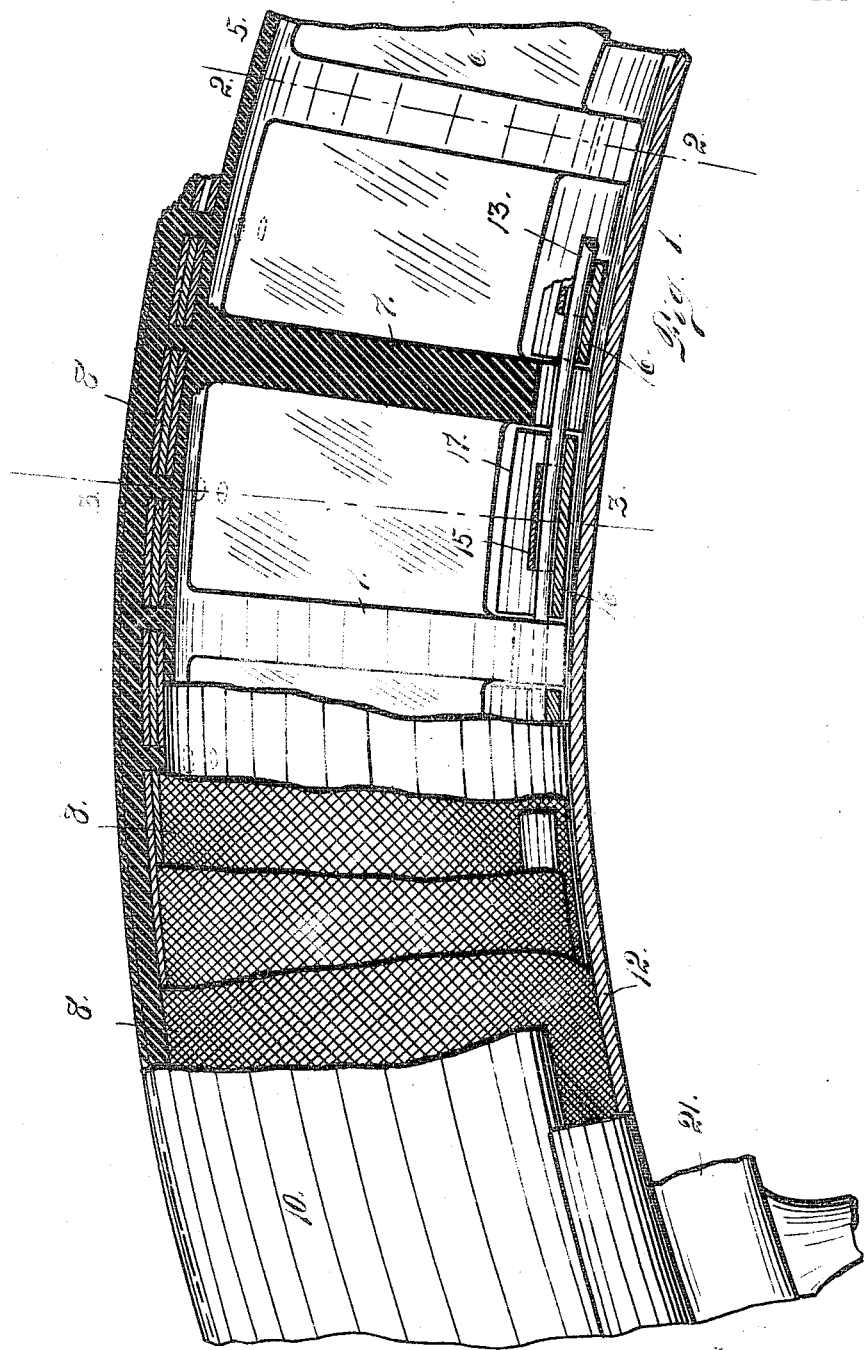

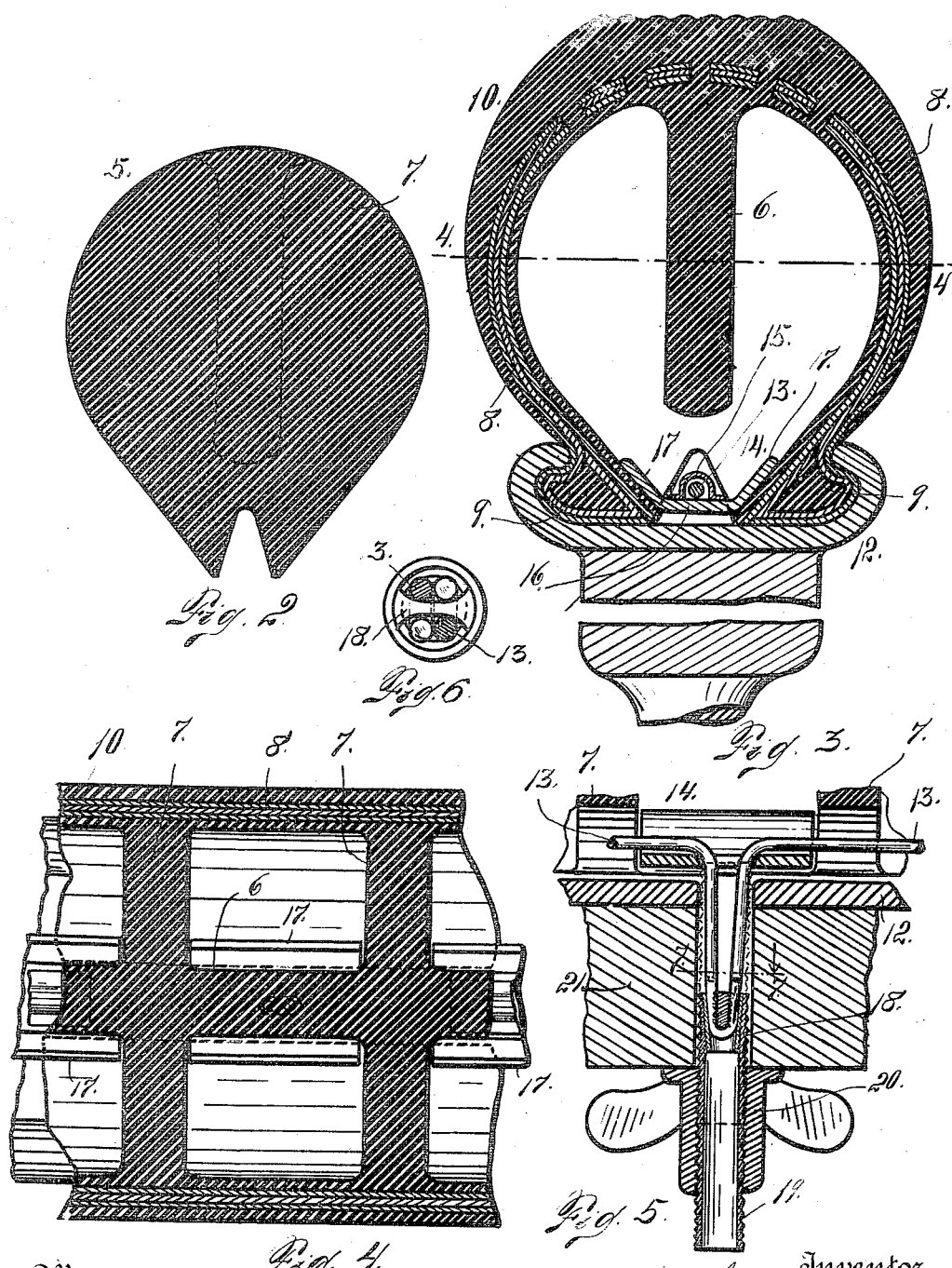

LEE KNAPP, OF DENVER, COLORADO, ASSIGNOR, BY MESNE ASSIGNMENTS, OF ONE-HALF TO THE FAWKES INTERNATIONAL RUBBER COMPANY, A CORPORATION OF SOUTH DAKOTA, AND ONE-HALF TO THE DAYTON RUBBER MANUFACTURING CO., OF DAYTON, OHIO, A CORPORATION OF OHIO.

CUSHION-TIRE.

982,968.

Specification of Letters Patent.   Patented Jan. 31, 1911.

Application filed March 11, 1907.  Serial No. 361,876.

*To all whom it may concern:*

Be it known that I, LEE KNAPP, a citizen of the United States, residing in the city and county of Denver and State of Colorado, have invented certain new and useful Improvements in Cushion-Tires; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in tires more especially adapted for use upon automobiles or other similar vehicles, where it is necessary that great strength and durability be combined with a suitable degree of elasticity or resilience. Pneumatic tires are not suitable for this use since they are liable to accident whereby they become deflated rendering the machine useless until repairs can be made.

My object therefore is to provide a cushion tire having a core of sufficient magnitude to obviate the necessity of inflation, the outer part of the tire being made sufficiently strong and durable for all practical purposes.

My further object is to provide a clencher tire of this character or a construction in which the tire is provided on opposite sides of its interior periphery with clencher beads adapted to engage the inwardly turned edges of a wheel rim, a flexible cable connected with the inner periphery of the tire on the inside, being employed to fasten the tire in place.

My improved tire is provided with a longitudinally - disposed, centrally - located, yielding partition extending from the tread of the tire on the inside, toward the inner periphery of the tire, the said partition dividing the space within the tire into compartments, the said partition being connected with the inner walls of the core, by laterally disposed lugs or wings which extend inwardly beyond the free edge of the partition, the said lugs having a slot preferably V-shaped registering with the slot at the inner periphery of the tire and located between the clencher beads of the latter.

Having briefly outlined my improved construction, I will proceed to describe the same in detail reference being made to the accompanying drawing in which is illustrated an embodiment thereof.

In this drawing, Figure 1 is a fragmentary longitudinal section taken through my improved device showing the various parts broken at different points to illustrate the construction of the tire. Fig. 2 is a cross section taken through the core on the line 2—2 Fig. 1. Fig. 3 is a section taken through the tire on the line 3—3 Fig. 1. Fig. 4 is a horizontal section taken on the line 4—4 Fig. 3. Fig. 5 is a section taken through the inner periphery of the tire showing the manner of securing the tire in place by means of a fastening cable. Fig. 6 is a section taken on the line 7—7 Fig. 5 viewed in the direction of the arrow, and on a larger scale the felly, however, not being shown.

The same reference characters indicate the same parts in all the views.

Let the numeral 5 designate the core of the tire, the outer walls of which approach each other at the inner periphery of the tire. This core consists of a centrally located partition 6 extending the entire length of the tire and projecting inwardly from the tread of the core beyond the longitudinal center of the tire, thereby dividing the space within the core into two compartments which are transversely separated by wings or lugs 7, which extend inwardly beyond the inner free edge of the partition 6, the two lugs or wings being joined adjacent the inner periphery of the tire. The lugs or wings 7 are located at suitable intervals, and they serve to support the tire, giving the latter great strength and durability, while at the same time allowing the tire sufficient elasticity or resilience for the purpose. Outside the core a number of sheets of canvas 8 or any suitable flexible material are applied, the said sheets being brought around clencher beads 9 on each side of the inner periphery of the tire. These clencher beads are composed of rubber and they are held in place by the canvas layers. Outside of these canvas layers, is located the tire portion 10 also composed of rubber or other similar material capable of vulcanization. Between the clencher beads the inner periphery of the tire is open and it is secured in place upon the rim 12 by means of a cable 13 having securing plates 14 threaded thereon, the said plates being provided with eyes 15 through which the cable passes. These plates as shown in the drawing have horizontally disposed parts 16 with which are formed integral outwardly inclined parts 17 engaging the inner wall of the tire on the inside. These parts or wings 17, extend outwardly sufficiently, to securely clamp the tire in place upon the rim when the cable is tightly secured in place. The extremities of this cable as shown in the drawing are drawn outwardly through an opening formed in the rim of the wheel, the said extremities being connected with a threaded bushing 18 inserted in an exteriorly threaded tube or sleeve 19 to which a winged nut 20 is applied, said nut being secured inwardly on the sleeve to engage with a felly 21 formed on the rim.

After the canvas layers 8 are applied to the core exteriorly as heretofore explained, or before they are applied, perforations may be formed therein, to allow the rubber during the process of vulcanization, to pass inwardly through the openings and unite with the core.

From the foregoing description the manner of applying the tire to the rims of wheels will be readily understood. The outer edges of the rims being turned inwardly (see Fig. 3) the clencher beads of the tire are made to engage these rims, the fastening cable and its clamping or securing plates having first been inserted in the tire through the opening in its inner periphery. The free extremities of the cable are then drawn through the opening in the inner periphery of the tire, thence through an opening in the rim and through the felly 21, the free extremities of the cable being connected with the bushing 18 inserted in the interiorly threaded portion of the sleeve 19 to which the winged nut 20 is applied as heretofore explained.

Attention is called to the fact that other applications will be filed covering the means for fastening the tire to wheel rims; also for the process of making the tire. Hence nothing is claimed in this application on the process or the fastening means.

Having thus described my invention, what I claim is:

1. A tire provided with a core having an interiorly projecting, centrally located, longitudinally disposed partition, extending the entire length of the tire, and passing inwardly beyond the longitudinal center of the tire, toward the inner periphery of the latter, and lugs connecting the said partition with the inner walls of the core, the said lugs being connected around the inner edge of the partition.

2. A tire provided with a core having outer walls approaching each other at the inner periphery of the tire, a centrally located, longitudinally disposed partition projecting from the tread of the core or its outer periphery inwardly toward the inner periphery of the tire, the said partition extending beyond the longitudinal center of the tire, and lugs suitably spaced on opposite sides of the partition and connecting the same with the inner walls of the core, the said lugs being united around the inner edge of the partition and provided with V-shaped openings, substantially as described.

3. A tire composed of a core having outer walls, a longitudinally disposed, centrally located partition extending from the outer portion of the core inwardly, whereby the said partition divides the space within the core into two compartments, lugs or wings located in the said compartments and connecting the partition with the inner surface of the wall of the core, the said lugs extending around the inner edge of the partition where they are united with each other, a plurality of canvas layers applied to the outer surface of the core, and a rubber layer applied to the outer surface of the canvas, the entire structure being vulcanized, substantially as described.

In testimony whereof I affix my signature in presence of two witnesses.

LEE KNAPP.

Witnesses:
S. D. LIEURANCE,
A. J. O'BRIEN.